United States Patent
Altonen et al.

(10) Patent No.: US 9,604,398 B2
(45) Date of Patent: Mar. 28, 2017

(54) INJECTION MOLD WITH FAIL SAFE PRESSURE MECHANISM

(71) Applicant: IMFLUX INC, Hamilton, OH (US)

(72) Inventors: Gene Michael Altonen, West Chester, OH (US); Ralph Edwin Neufarth, Liberty Township, OH (US); Vincent Sean Breidenbach, Lebanon, OH (US); Dennis James Pratel, Union Township, OH (US); Walter Thomas Davis, III, West Chester, OH (US); Danny David Lumpkin, Cincinnati, OH (US)

(73) Assignee: IMFLUX INC, Hamilton, OH (US)

( * ) Notice: Subject to any disclaimer, the term of this patent is extended or adjusted under 35 U.S.C. 154(b) by 664 days.

(21) Appl. No.: 13/672,246

(22) Filed: Nov. 8, 2012

(65) Prior Publication Data

US 2014/0127338 A1    May 8, 2014

(51) Int. Cl.
  *B29C 45/77*  (2006.01)
  *B29C 45/23*  (2006.01)
  (Continued)

(52) U.S. Cl.
  CPC .......... *B29C 45/77* (2013.01); *B29C 45/1781* (2013.01); *B29C 45/234* (2013.01); *B29C 45/768* (2013.01); *B29C 45/7653* (2013.01); *B29C 45/84* (2013.01); *B29C 33/0011* (2013.01); *B29C 2045/1796* (2013.01); *B29C 2045/2722* (2013.01); *B29C 2945/7621* (2013.01); *B29C 2945/76498* (2013.01); *B29C 2945/76598* (2013.01); *B29C 2945/76665* (2013.01); *B29C 2945/76765* (2013.01);
  (Continued)

(58) Field of Classification Search
  CPC .... B29C 2045/1796; B29C 2045/2722; B29C 2945/7621; B29C 2945/76498; B29C 2945/76598; B29C 2945/76665; B29C 2945/76765; B29C 2945/76859; B29C 2945/76923; B29C 33/0011; B29C 45/1781; B29C 45/234; B29C 45/7653; B29C 45/768; B29C 45/77; B29C 45/84
  USPC ................................ 425/145, 146, 151, 153
  See application file for complete search history.

(56) References Cited

U.S. PATENT DOCUMENTS 4,219,322 A   8/1980 Chang et al.
5,350,288 A   9/1994 Kimoto et al.
(Continued)

FOREIGN PATENT DOCUMENTS

DE    2427969 A1    1/1976
DE    102009046835 A1    5/2011
(Continued)

OTHER PUBLICATIONS

Schnerr-Haeselbarth O:"Der Heisse Draht Ins Werkzeug Werkseuginnendruck-Basierte Systeme Steigern Die Produktivitat Und Senken Die Kosten", Kunstoffe International, Carl Hanser Verlag, Munchen DE, vol. 92, No. 7, Jul. 1, 2002, pp. 56-60.
(Continued)

*Primary Examiner* — Robert J Grun
(74) *Attorney, Agent, or Firm* — Marshall, Gerstein & Borun LLP

(57) ABSTRACT

A low pressure injection mold includes a failsafe pressure mechanism that prevents the low pressure injection mold from being subjected to excessive injection pressures or excessive clamping tonnage that could damage the low pressure injection mold.

7 Claims, 17 Drawing Sheets

(51) Int. Cl.
*B29C 45/17* (2006.01)
*B29C 45/76* (2006.01)
*B29C 45/84* (2006.01)
*B29C 33/00* (2006.01)
*B29C 45/27* (2006.01)

(52) U.S. Cl.
CPC .............. *B29C 2945/76859* (2013.01); *B29C 2945/76923* (2013.01)

(56) References Cited

U.S. PATENT DOCUMENTS

| | | |
|---|---|---|
| 5,407,342 A | 4/1995 | Boucher et al. |
| 5,411,686 A | 5/1995 | Hata |
| 5,419,858 A | 5/1995 | Hata et al. |
| 5,478,520 A | 12/1995 | Kasai et al. |
| 5,518,389 A | 5/1996 | Nonomura et al. |
| 5,716,561 A | 2/1998 | Guergov |
| 5,728,329 A | 3/1998 | Guergov |
| 5,853,630 A | 12/1998 | Hettinga |
| 5,902,525 A | 5/1999 | Hettinga |
| 5,935,505 A | 8/1999 | Whetten et al. |
| 6,090,318 A | 7/2000 | Bader et al. |
| 6,372,162 B1 | 4/2002 | Szczech |
| 6,464,909 B1 | 10/2002 | Kazmer et al. |
| 6,616,871 B1 | 9/2003 | Iimura et al. |
| 6,824,379 B2 | 11/2004 | Doyle et al. |
| 7,419,625 B2 | 9/2008 | Vasapoli et al. |
| 7,785,090 B2 | 8/2010 | Amano et al. |
| 7,910,029 B2 | 3/2011 | Koumaro |
| 8,235,694 B2 | 8/2012 | Nam |
| 2001/0013672 A1 | 8/2001 | Kawamura et al. |
| 2008/0064805 A1 | 3/2008 | Uosaki et al. |
| 2008/0143006 A1 | 6/2008 | Honma et al. |
| 2012/0035327 A1 | 2/2012 | Ciarafoni et al. |
| 2012/0291885 A1 | 11/2012 | Altonen et al. |
| 2012/0292823 A1 | 11/2012 | Altonen et al. |
| 2012/0294963 A1 | 11/2012 | Altonen et al. |
| 2012/0295049 A1 | 11/2012 | Altonen et al. |
| 2012/0295050 A1 | 11/2012 | Altonen et al. |
| 2012/0328724 A1 | 12/2012 | Altonen et al. |
| 2012/0329948 A1 | 12/2012 | Altonen et al. |
| 2013/0295219 A1 | 11/2013 | Neufarth et al. |
| 2013/0295220 A1 | 11/2013 | Neufarth et al. |

FOREIGN PATENT DOCUMENTS

| | | |
|---|---|---|
| GB | 2164895 A | 4/1986 |
| JP | 60127125 | 7/1985 |
| JP | 2098417 A | 4/1990 |
| JP | 3079317 A | 4/1991 |
| JP | 4126214 A | 4/1992 |
| JP | 5006914 A | 1/1993 |
| JP | 7223242 A | 8/1995 |
| JP | 11262936 | 9/1999 |
| JP | 2000280276 A | 10/2000 |
| JP | 2005215497 | 8/2005 |

OTHER PUBLICATIONS

Wikipedia: "Low Pressure Molding", pp. 1-4, XP002681936, Internet: http:en.wikipedia.org/wiki/Low_pressure_molding.
Homes W et al: "Spritzgiessprozesse in Echtzeit Regeln Eine Neue Technik Zur Aktiven Angussbalancierung", Kunstoffe International. Carl Hanser Verlag, Munchen DE, vol. 91, No. 1, Jan. 1, 2001, pp. 68-70.
Suh et al., "Structure Development of Various Polyolefins in Injection Molding", Antec 2006, Society of Plastics Engineers, 2006, pp. 760-765.
International Search Report, U.S. Appl. No. 13/476,045, dated Aug. 17, 2012, 14 pages.
International Search Report, U.S. Appl. No. 13/476,045, dated Aug. 16, 2012, 12 pages.
International Search Report, U.S. Appl. No. 13/476,073, dated Sep. 3, 2012, 16 pages.
International Search Report, U.S. Appl. No. 13/476,197, dated Aug. 16, 2012, 11 pages.
International Search Report, U.S. Appl. No. 13/476,178, dated Aug. 17, 2012, 13 pages.
International Search Report, U.S. Appl. No. 13/476,584, dated Aug. 17, 2012, 13 pages.
ALCOA:"QC-10 the aluminum mold alloy that out-machines, out-cools, out-produces and outsmarts steel", brochure dated 2010, 12 pages, Alcoa Forgings and Extrusions, 1600 Harvard Avenue, Cleveland, Ohio 44105, www.alcoa.com.
"Specialized Aluminum Products for Tool and Mold Applications", May/Jun. 2003 issue of Aluminum Now journal of the Aluminum Association, Inc., 4 pages.
AMPCO Metal, "Ampcoloy®944: A new copper-silicon-chromium alloy for the Moldmaking Industry", brochure, 2 pages, www.ampcometal.com.
AMPCO Metal, "Ampcoloy®944", brochure, 2 pages, www.ampcometal.com.
Clinton Aluminum & Stainless Steel, "Why aluminum mold?" presentation, Oct. 30, 2006, 20 pages, toll free # 800-826-3370.
European Tool & Mould Making ETMM, "High strength, hardness, thermal conductivity characterize copper mould making alloy", online article Dec. 9, 2011, 2 pages, http://www.etmm-online.com/materials/articles/353445/.
AMPCO Metal Inc., "Procurable Alloys", online article Nov. 2011, 5 pages, http://www.modernmetals.com/item/10715-procurable-alloys.html.
Sherry Baranek, "The Realities of Aluminum Tooling", article from Moldmaking Technology magazine dated Dec. 1, 2008, 4 pages, http://www.moldmakingtechnology.com/articles/the-realities-of-aluminum-tooling.
David Bank, "Choosing the Right Aluminum Alloy for Production Injection Molds", article from Moldmaking Technology magazine dated Jun. 1, 2007, 4 pages, http://www.moldmakingtechnology.com/articles/choosing-the-right-aluminum-alloy-for-production-injection-molds.
United States Patent and Trademark Office, online Trademark Electronic Search System, Moldmax HH, 2 pages, http://tess2.uspto.gov/bin/showfield?f=doc&state=4808:k8aqoi.3.8.
Rhoda Miel, "Aluminating Tooling", PlasticsNews.com online article Apr. 27, 2009, 2 pages, http://www.plasticsnews.com/article/20090427/News/304279985/aluminating-tooling.
Joseph Pryweller, "Aluminum Injection Mold", online article from PlasticsNews.com, Jan. 13, 2003, 2 pages, http://aluminuminjectionmold.com/articles.html.
David Bank et al., "Why Plastic Flows Better in Aluminum Injection Molds", plastics technology article Sep. 2008, 8 pages.
Plastics Today, "Aluminum molds or steel? In the test, Al is the clear winner", online article Jan. 31, 2011, 2 pages, http://www.plasticstoday.com/articles/aluminum-molds-or-steel-test-aluminum-clear-winner.
A L Kelly, et al, "The effect of copper alloy mold tooling on the performance of the injection molding process", online article from the Free Library, 10 pages, http://www.thefreelibrary.com/The+effect+of+copper+alloy+mold+tooling+on+the+performance.
United States Patent and Trademark Office, online Trademark Electronic Search System, QC 10, 2 pages, http://tess2.uspto.gov/bin/showfield?f=doc&state=4810:7di60m.2.1.
Thyssenkrupp Materials NA, "QC-10 Aluminum Mold Plate", brochure, 4 pages.
Uddeholm, "Moldmax HH", brochure, 8 pages, www.uddeholm.com.
Li et al., Automatic Layout Design of Plastic Injection Mould Cooling System, Computer-aided Design 37 (2005) 645-662.
International Search Report, U.S. Appl. No. 13/682,456, dated Aug. 2, 2013, 11 pages.
U.S. Appl. No. 61/602,781, filed Feb. 24, 2012, Altonen et al.
U.S. Appl. No. 61/602,650, filed Feb. 24, 2012, Berg, Jr. et al.
U.S. Appl. No. 13/601,359, filed Aug. 31, 2012, Neufarth et al.
U.S. Appl. No. 13/765,428, filed Feb. 12, 2013, Neufarth et al.
U.S. Appl. No. 13/476,584, filed May 21, 2012, Altonen et al.

(56) References Cited

OTHER PUBLICATIONS

U.S. Appl. No. 13/601,514, filed Aug. 31, 2012, Altonen et al.
U.S. Appl. No. 13/682,456, filed Nov. 20, 2012, Altonen et al.
U.S. Appl. No. 61/728,764, filed Nov. 20, 2012, Altonen et al.
U.S. Appl. No. 61/729,028, filed Nov. 21, 2012, Altonen et al.
U.S. Appl. No. 61/861,298, filed Aug. 1, 2013, Altonen et al.
U.S. Appl. No. 61/861,304, filed Aug. 1, 2013, Altonen et al.
U.S. Appl. No. 61/861,310, filed Aug. 1, 2013, Altonen et al.
U.S. Appl. No. 14/085,515, filed Nov. 20, 2013, Altonen et al.
U.S. Appl. No. 14/086,356, filed Nov. 20, 2013, Altonen et al.

Check ring having rupture disks or pressure relief threshold mechanisms to prevent damaging inection mold tool from excessive cavity pressures If pressure threshold is exceeded, mechanisms open allowing flow of material upstream into barrel via a series of channels and cross holes

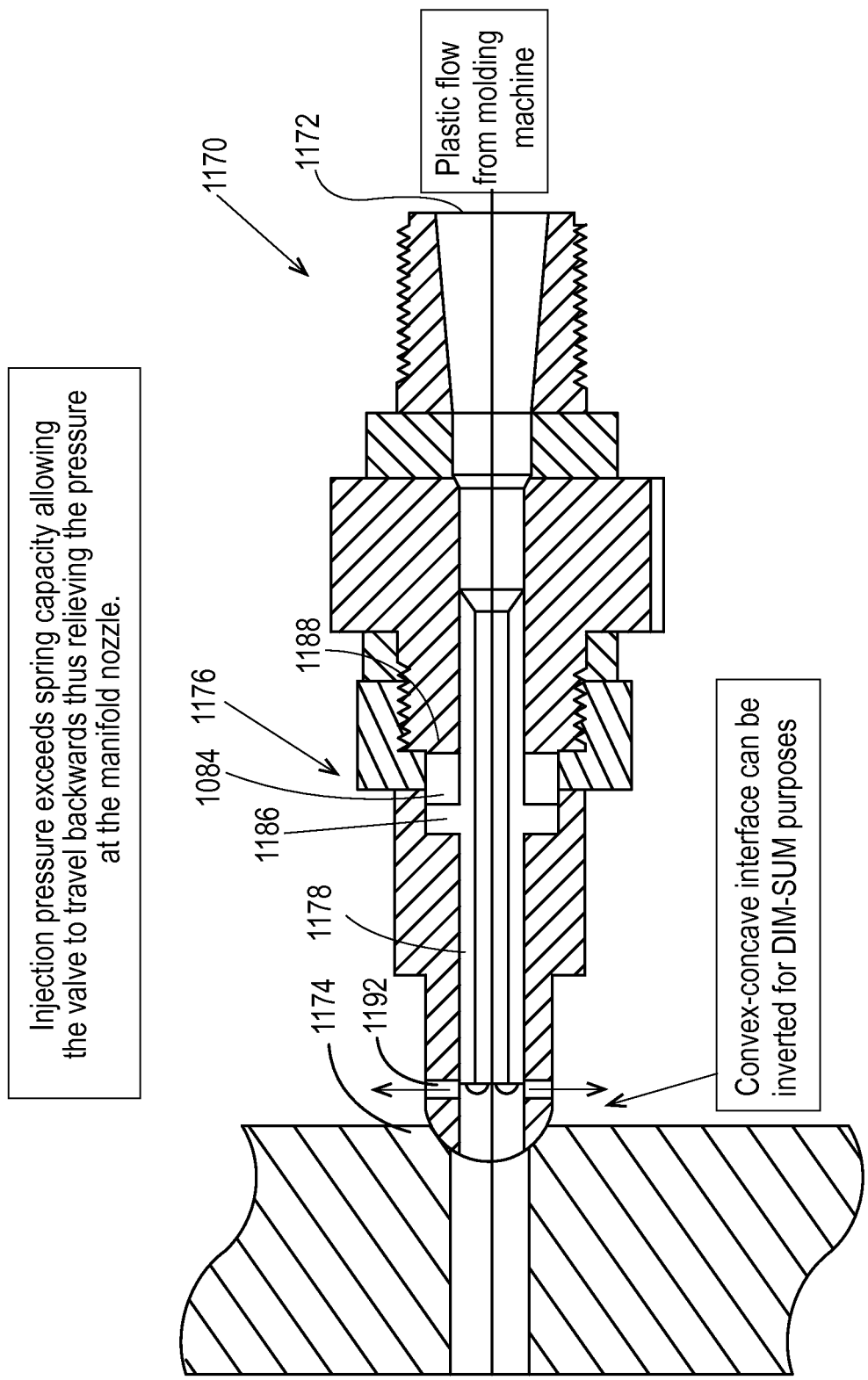

INJECTION MOLD WITH FAIL SAFE PRESSURE MECHANISM

TECHNICAL FIELD

The present invention relates to apparatuses for injection molding and, more particularly, to injection molds having a failsafe overpressure mechanism.

BACKGROUND

Injection molding is a technology commonly used for high-volume manufacturing of parts made of meltable material, most commonly of parts made of thermoplastic polymers. During a repetitive injection molding process, a plastic resin, most often in the form of small beads or pellets, is introduced to an injection molding machine that melts the resin beads under heat, pressure, and shear. The now molten resin is forcefully injected into a mold cavity having a particular cavity shape. The injected plastic is held under pressure in the mold cavity, cooled, and then removed as a solidified part having a shape that essentially duplicates the cavity shape of the mold. The mold itself may have a single cavity or multiple cavities. Each cavity may be connected to a flow channel by a gate, which directs the flow of the molten resin into the cavity. Thus, a typical injection molding procedure comprises four basic operations: (1) heating the plastic in the injection molding machine to allow it to flow under pressure; (2) injecting the melted plastic into a mold cavity or cavities defined between two or more mold parts that have been closed; (3) allowing the plastic to cool and harden in the cavity or cavities while under pressure; and (4) opening the mold parts to cause the part to be ejected from the mold.

The molten plastic resin is injected into the mold cavity and the plastic resin is forcibly pushed through the cavity by the injection molding machine until the plastic resin reaches the location in the cavity furthest from the gate. The resulting length and wall thickness of the part is a result of the shape of the mold cavity.

Generally speaking, as a liquid plastic resin is introduced into an injection mold in a conventional injection molding process, the material adjacent to the walls of the cavity immediately begins to "freeze," or solidify and/or cure. As the material flows through the mold, a boundary layer of material is formed against the sides of the mold. As the mold continues to fill, the boundary layer continues to thicken, eventually closing off the path of material flow and preventing additional material from flowing into the mold. The plastic resin freezing on the walls of the mold is exacerbated when the molds are cooled, a technique used to reduce the cycle time of each part and increase machine throughput.

To overcome the problem of freeze off, the injection pressure of the liquid plastic resin as it is introduced into the mold is increased, typically to 103.421 MPa (15,000 psi), or more. By increasing the pressure, the molding machine can continue to force liquid material into the mold before the flow path has closed off. As the pressure required to mold the component increases, the molding equipment must be strong enough to withstand the additional pressure.

Many conventional injection molding operations use shear-thinning plastic material to improve flow of the plastic material into the mold cavity. As the shear-thinning plastic material is injected into the mold cavity, shear forces generated between the plastic material and the mold cavity walls tend to reduce viscosity of the plastic material, thereby allowing the plastic material to flow more freely and easily into the mold cavity. As a result, it is possible to fill thinwall parts fast enough to avoid the material freezing off before the mold is completely filled.

Reduction in viscosity is directly related to the magnitude of shear forces generated between the plastic material and the feed system, and between the plastic material and the mold cavity wall. Thus, manufacturers of these shear-thinning materials and operators of injection molding systems have been driving injection molding pressures higher in an effort to increase shear, thus reducing viscosity. As stated above, injection molding systems typically inject the plastic material in to the mold cavity at melt pressures of 103.421 MPa (15,000 psi) or more.

The molds used in injection molding machines must be capable of withstanding these high melt pressures. Moreover, the material forming the mold must have a fatigue limit that can withstand the maximum cyclic stress for the total number of cycles a mold is expected to run in its lifetime. As a result, mold manufacturers typically form the mold parts from materials having high hardness, typically greater than 30 Rc, and more typically greater than 50 Rc. These high hardness materials are durable and equipped to withstand the high clamping pressures required to keep mold components pressed against one another during the plastic injection process. These high hardness materials are also better able to resist wear from the repeated contact between molding surfaces and polymer flow.

Recently, injection molding techniques have been developed that use lower injection pressures. These lower pressure techniques allow the mold parts to be made of materials having high average thermal conductivities (e.g., greater than 51.9 W/m ° C. (30 BTU/HR FT ° F.)) to improve cooling times and thus shorten cycle times. However, these high average thermal conductivity materials are generally softer (e.g., having an average Rockwell Hardness of less than 30 Rc) than the high hardness materials used for mold parts in typical high pressure injection molding machines. These mold parts may be used in high productivity injection molding machines (i.e., injection molding machines having one or more of thin walled mold cavities (L/T>100), four or more mold cavities, and guided ejection systems). These mold parts may be made of easily machineable materials, such as materials having a milling machining index of greater than 100%, a drilling machining index of greater than 100%, and/or a wire EDM machining index of greater than 100%, as described in International Patent Application Nos. PCT/US12/38744 and PCT/US12/38846, each of which is hereby incorporated by reference herein.

Because the low pressure mold parts may have physical dimensions that are similar to high pressure mold parts, there is a danger that the low pressure mold parts may accidentally be placed in a high pressure apparatus, or otherwise be subjected to high injection pressures or high clamp tonnages, which destroy or deform the low pressure mold by causing instant failure or fatigue failure over time, thus reducing the useful lifetime of the mold parts.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 9D is a longitudinal cross-sectional view of the pressure relief device of FIG. 9A in an excess pressure condition that vents excess fluid pressure before entering the mold.

DETAILED DESCRIPTION

Embodiments of the present invention generally relate to systems, machines, products, and methods of producing products by injection molding and more specifically to systems, products, and methods of preventing a low pressure injection mold from being exposed to excessive injection pressure or excessive clamp tonnage that could damage the low pressure injection mold or mold parts, or diminish the serviceable lifetime of a the low pressure injection mold or mold parts.

The term "low pressure" as used herein with respect to melt pressure of a thermoplastic or thermoset material, means melt pressures in a vicinity of a nozzle of an injection molding machine of approximately 41.38 MPa (6000 psi) and lower.

The term "fail safe device" as used herein means any device that directly or indirectly prevents overpressurization of a mold cavity. The fail safe device may be an electrical device, a mechanical device, a pneumatic device, or any combination thereof. The fail safe device may provide electronic signals, mechanical signals, fluid signals, pneumatic signals, or any combination thereof to stop an injection molding process when an overpressurization condition is detected. One or more components of the fail safe device may be located in the barrel, the nozzle, the gate, or the mold, or otherwise be attached to any of the barrel, the nozzle, the gate, and the mold. Generally speaking the fail safe device may only be overridden by an intentional action from an operator.

While the molds described herein may be made of softer materials (e.g., Rc less than 30) that have relatively high thermal conductivities (such as aluminum), when a mold (or a first and a second mold part) is defined as having a Rc of less than 30, the mold (or mold part) is has an average Rc of less than 30. In some cases, a harder material (such as steel) gate may be used to reduce gate erosion while not increasing the average thermal conductivity of the mold (or mold part) above 30 Rc.

Figure 1:
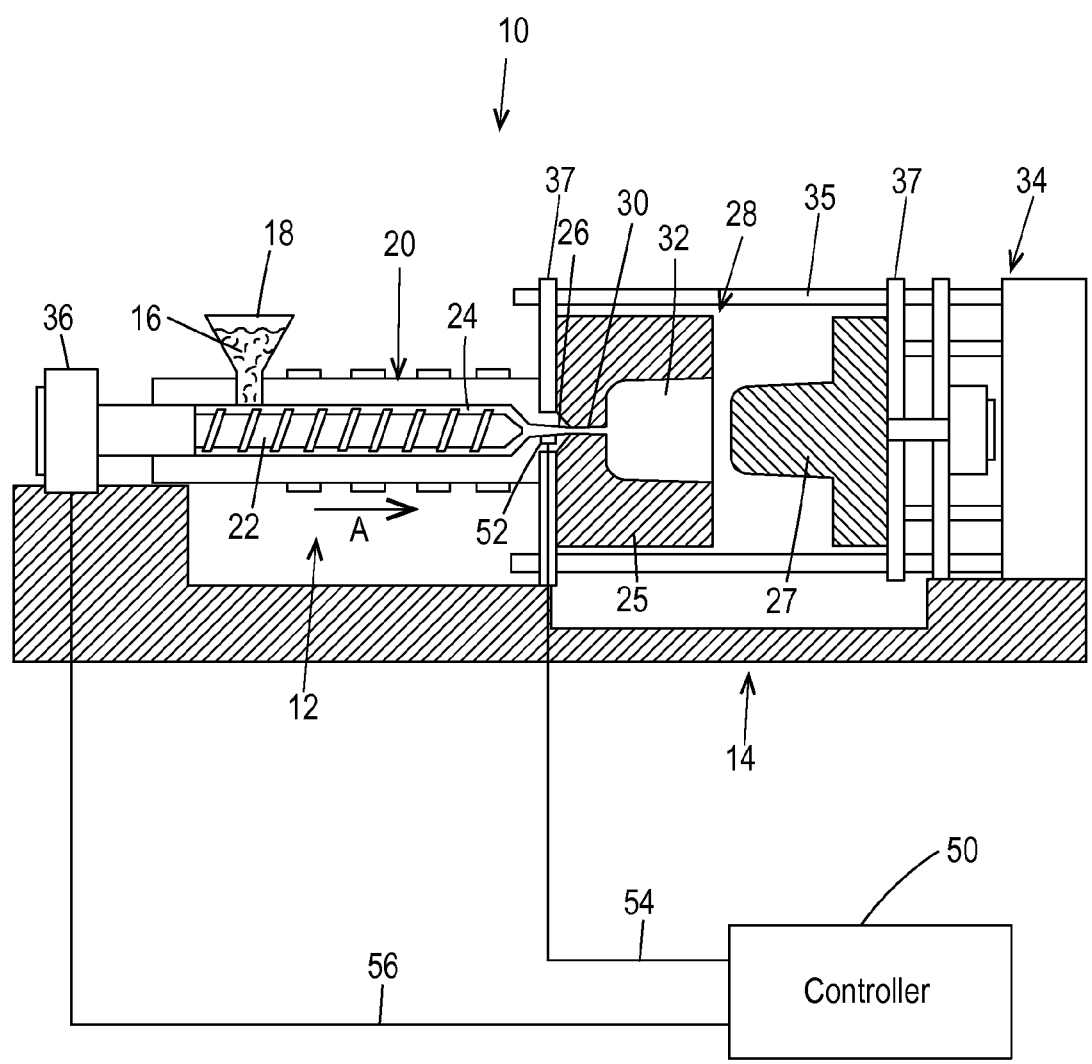
FIG. 1 illustrates a schematic view of an injection molding machine constructed according to the disclosure.

Referring to the figures in detail, FIG. 1 illustrates an exemplary injection molding apparatus 10 for producing thin-walled parts in high volumes. The exemplary injection molding apparatus 10 includes one or more failsafe features that prevent a low pressure mold from being subjected to excessive fluid pressures (i.e., more than about 68.95 MPa (10,000 psi)). The injection molding apparatus 10 generally includes an injection system 12 and a clamping system 14. A thermoplastic or thermoset material may be introduced to the injection system 12 in the form of thermoplastic or thermoset pellets 16. The thermoplastic or thermoset pellets 16 may be placed into a hopper 18, which feeds the thermoplastic or thermoset pellets 16 into an injection cylinder or heated barrel 20 of the injection system 12. The thermoplastic or thermoset pellets 16, after being fed into the heated barrel 20, may be driven to the end of the heated barrel 20 by a reciprocating screw 22. Heating of the heated barrel 20 and the compression of the thermoplastic or thermoset pellets 16 by the reciprocating screw 22 causes the thermoplastic or thermoset pellets 16 to melt, forming a molten thermoplastic or thermoset material 24. The molten thermoplastic or thermoset material 24 is typically processed at a temperature of about 130° C. (266° F.) to about 410° C. (770° F.).

The reciprocating screw 22 forces the molten thermoplastic or thermoset material 24, toward a nozzle 26 to form a shot of thermoplastic or thermoset material, which will be injected into a mold cavity 32 of a mold 28. The molten thermoplastic or thermoset material 24 may be injected through a gate 30, which directs the flow of the molten thermoplastic or thermoset material 24 to the mold cavity 32. The mold cavity 32 is formed between first and second mold parts 25, 27 of the mold 28 and the first and second mold parts 25, 27 are held together under pressure by a press or clamping unit 34. The press or clamping unit 34 applies a clamping force during the molding process to hold the first and second mold parts 25, 27 together while the molten thermoplastic or thermoset material 24 is injected into the mold cavity 32. To support these clamping forces, the clamping system 34 may include a mold frame 35 and one or more support plates 37 that transfer clamping forces from the clamping unit 34 to the first and second mold parts 25, 27 during the injection molding process.

Once the shot of molten thermoplastic or thermoset material 24 is injected into the mold cavity 32, the reciprocating screw 22 stops traveling forward. The molten thermoplastic or thermoset material 24 takes the form of the mold cavity 32 and the molten thermoplastic or thermoset material 24 cools inside the mold 28 until the thermoplastic or thermoset material 24 solidifies. Once the thermoplastic or thermoset material 24 has solidified, the press 34 releases the first and second mold parts 25, 27, the first and second mold parts 25, 27 are separated from one another, and the finished part may be ejected from the mold 28. The mold 28 may include a plurality of mold cavities 32 to increase overall production rates.

The injection molding apparatus 10 may include fail safe device in the form of a pressure limiting device to limit injection pressure. In one embodiment, the pressure limiting device may include a controller 50 that is communicatively connected with a sensor 52, the injection cylinder or heated barrel 20, and/or a screw control 36. The controller 50 may include a microprocessor, a memory, and one or more communication links The controller 50 may be connected to the sensor 52 and the screw control 36 via wired connections 54, 56, respectively. In other embodiments, the controller 50 may be connected to the sensor 52 and screw control 56 via a wireless connection, a mechanical connection, a hydraulic connection, a pneumatic connection, or any other type of communication connection known to those having ordinary skill in the art that will allow the controller 50 to communicate with both the sensor 52 and the screw control 36.

In the embodiment of FIG. 1, the sensor 52 is a pressure sensor that measures (directly or indirectly) melt pressure of the molten thermoplastic or thermoset material 24 in the nozzle 26. The sensor 52 generates an electrical signal that is transmitted to the controller 50. The controller 50 then commands the screw control 36 to advance the screw 22 at a rate that maintains a desired melt pressure of the molten thermoplastic or thermoset material 24 in the nozzle 26. While the sensor 52 may directly measure the melt pressure, the sensor 52 may measure other characteristics of the molten thermoplastic or thermoset material 24, such as temperature, viscosity, flow rate, etc, that are indicative of melt pressure. Likewise, the sensor 52 need not be located directly in the nozzle 26, but rather the sensor 52 may be located at any location within the injection system 12 or mold 28 (which includes one or more mold parts 25, 27) that is fluidly connected with the nozzle 26. If the sensor 52 is not located within the nozzle 26, appropriate correction factors may be applied to the measured characteristic to calculate the melt pressure in the nozzle 26.

In one embodiment, the sensor 52 may be attached to the mold 28 or to one of the first and second mold parts 25, 27. The sensor 52 may also be programmed with a maximum pressure reading based on a maximum pressure rating of the mold 28 or a maximum pressure rating of one of the first and second mold parts 25, 27. For example, the sensor may be programmed with a 68.95 MPa (10,000 psi) maximum pressure. This maximum pressure may be communicated to the controller 50 when the mold 28 is installed in the injection molding machine 10. If the sensor 52 is subjected to a pressure in excess of the maximum pressure, the controller 50 may shut down the injection molding machine 10 to prevent damage to the mold 28. Thus, the mold 28 includes a failsafe capability due to the sensor 52 being attached to the mold 28 and the sensor 52 being programmed with a maximum pressure.

In another embodiment, when the maximum pressure is exceeded, the controller 50 may set off or activate an alarm or warning, which would alert an operator to the overpressure condition. The operator could decide whether the injection molding machine 10 should be shut down or not. The alarm or warning could be visual (e.g., a flashing light), aural/audible (e.g., a horn), tactile (e.g., a vibrating control pad), or any combination thereof. In other embodiments, the alarm or warning may include an electronic communication, such as an email or text message, sent to smart phones or other handheld electronic devices. An alarm may be useful in tracking the number of times a maximum pressure is exceeded to determine when the useful life of a mold has expired. This feature advantageously allows a user to determine when a softer metallurgy mold part has reached the end of its useful life. Softer metals are more susceptible to premature failure when repeatedly exposed to pressures in excess of a maximum design pressure. For example, an aluminum mold may have a 5,000,000 cycle life expectancy at a 34.47 MPa (5,000 psi) maximum injection pressure and a 2,000,000 cycle life expectancy at a 68.95 MPa (10,000 psi) maximum injection pressure.

In an alternative embodiment, a visual sensor (not shown) may be communicatively connected to the controller 50. The visual sensor detects the presence of plastic within the mold after the molding cycle has completed. The visual sensor may prevent damage to the mold parts by allowing the controller 50 to stop the molding process when plastic is left between the mold parts from a previous molding cycle.

In yet other embodiments, the controller 50 may be programmable to properly adjust a maximum pressure. When the mold 28 is installed in the injection molding machine 10, an operator may set the controller with a maximum pressure setting based on a maximum rated pressure for the mold 28. In some embodiments, the maximum pressure setting may be stored in an electronic media and/or an optical media (such as a microchip, an RFID chip, a bar code, or a QR code) that is electronically and/or optically read by the controller when the mold is installed in the press. The electronic or optical media may be permanently fixed or attached to the mold to prevent incorrect maximum pressure settings from being associated with the mold. The maximum pressure may be based at least in part on the material forming the mold and the dimensional characteristics of the mold 28. Virtual modeling tools may be used during a design phase of producing the mold 28 to determine the maximum rated pressure of the mold 28. Once the controller 50 is programmed with the maximum pressure setting, the controller 50 may activate an alarm or warning, or shut down the injection molding process, when the maximum pressure is sensed by the sensor 52.

Figure 2:
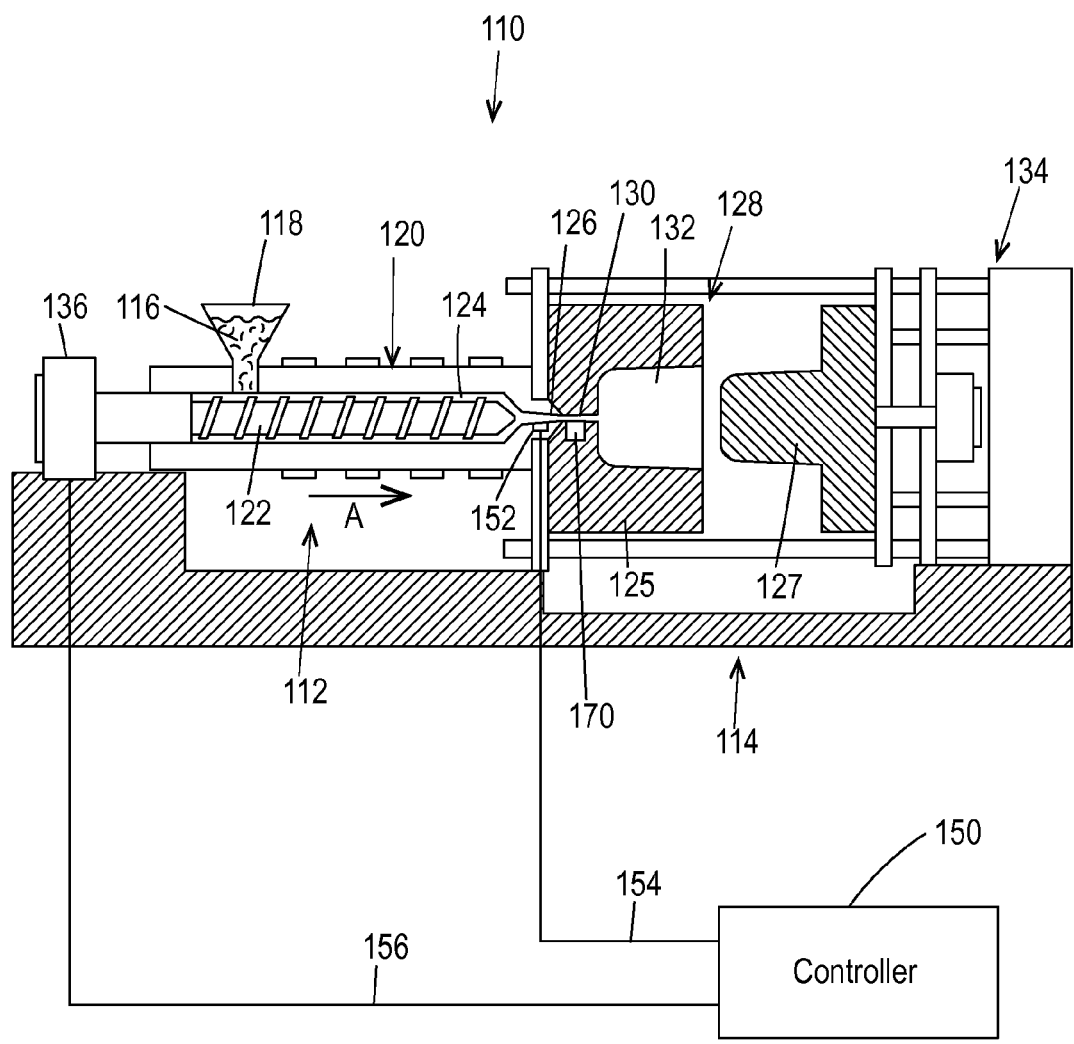
FIG. 2 illustrates a schematic view of a second embodiment of an injection molding machine.

In still other embodiments, the pressure limiting device may be a mechanical mechanism that limits injection pressure supplied to the mold 28. In one embodiment, as illustrated in FIG. 2, the injection molding machine 110 may include a pressure limiting device comprising a mechanical pressure relief mechanism 170. Elements and features of the embodiment of FIG. 2 that correspond to like elements and features of the embodiment of FIG. 1 are numbered 100 greater that the corresponding element or feature of FIG. 1. The mechanical pressure relief mechanism 170 may be located between the injection unit 112 and the mold cavity 132, preferably downstream of the nozzle 126 proximate to the gate 130. Preferably the mechanical pressure relief mechanism 170 is located within, or attached to, the mold 128 so that the mold 128 and the pressure relief mechanism 170 are installed in the injection molding machine 110 as a unit. In one embodiment, the pressure relief mechanism 170 may take the form of a rupture disk, which is located in fluid communication with the flow of polymer. Some examples of acceptable rupture disks include GPMS Extruder Rupture Disks (Burst Plugs) manufactured by DME molding supplies, ERD extruder rupture disks manufactured by FIKE®, extruder rupture disks manufactured by MPI Melt Pressure Inc., and Rupture Disks manufactured by TEMPCO electric heater Corp.

If the injection pressure exceeds a predetermined pressure limit, the rupture disk fractures and vents all melt pressure upstream of the pressure relief mechanism out of the injection molding machine 110. This pressure venting prevents excessive melt pressure from reaching the mold cavity, where damage could occur. Preferably, upon fracturing of the rupture disk an electronic signal is transmitted to the controller 150, which would stop the injection molding process until corrective action could be taken. In other embodiments, a pressure relief valve or a pressure regulating valve could be used instead of a rupture disk. The pressure relief valve or pressure regulating valve limits pressure of the molten thermoplastic or thermoset material within the barrel to a maximum value while still allowing the molten thermoplastic or thermoset material to flow into the mold cavity. In some embodiments, a pressure activated by-pass or flow recirculation valve could also be used that reroutes relieved molten thermoplastic or thermoset material back into the barrel to prevent waste of the thermoplastic or thermoset material.

Figure 3:
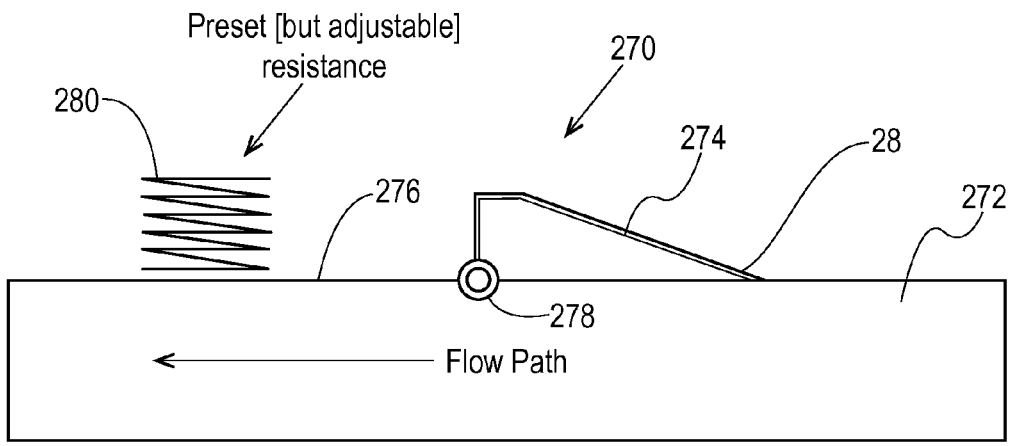
FIG. 3 is a schematic illustration of a pressure blocking device that may be incorporated into a low pressure mold.
Figure 3:
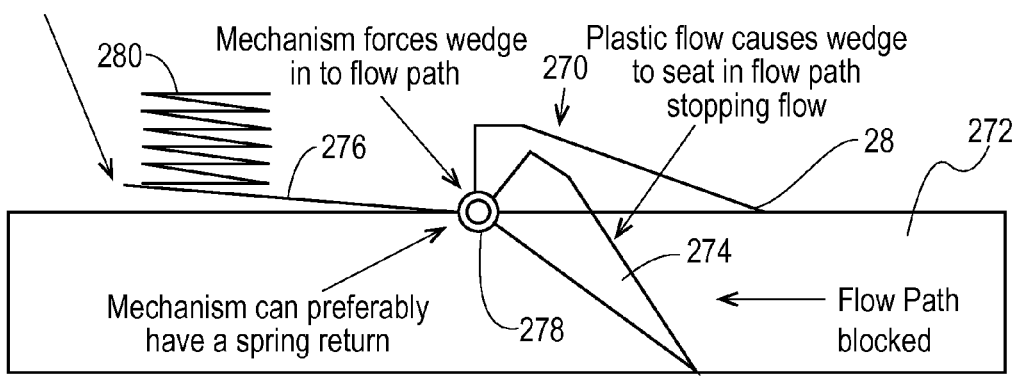

In still other embodiments, the mechanical pressure relief mechanism 170 could take the form of a pressure blocking device 270, as illustrated in FIG. 3. The pressure blocking device 270 may be located adjacent to, and at least partially within, a fluid flow path 272 of the molten thermoplastic or thermoset material. Preferably, the pressure blocking device 270 is located within, attached to, or otherwise operatively connected with the mold 28. The pressure blocking device 270 includes a blocking arm 274 that is pivotably mounted to the mold 28. The pressure blocking device 270 also includes an actuation arm 276 that is also pivotably mounted to the mold 28. The blocking arm 274 and the actuation arm 276 share a common hinge or pivot 278. The actuation arm 276 is biased to a flow position by a biasing element such as a spring 280. In the flow position, the actuation arm 276 is substantially parallel to the fluid flow path 272. When fluid pressure in the fluid flow path 272 exceeds a preset limit (as determined by the biasing force provided by the biasing element 280, which may be adjustable) the actuation arm 276 raises or rotates about the pivot 278, which causes the blocking arm 274 to also rotate about the pivot 278 into a blocking position where the blocking arm 274 prevents fluid flow through the fluid flow path 272. Once the blocking arm 274 begins to move into the flow path 272, fluid pressure causes the blocking arm 274 to become firmly seated within the flow path 272, thereby preventing fluid flow through the flow path 274. In some embodiments a return device (not shown) may move the blocking arm 274 back to a full flow position when fluid pressure returns below the preset limit. The pressure blocking device 270 may include a locking mechanism (not shown) that locks the blocking arm 274 in the blocking position once the pressure blocking device 270 is activated so that fluid flow is prevented until corrective action has been taken.

In other embodiments, the activation arm 276 and the blocking arm 274 may rotate freely about the pivot 278, while being biased by the spring 280, without being locked in any particular position. As a result, the blocking arm 274, when moving towards the blocking position, may reduce fluid pressure downstream of the pressure blocking device 270. This reduction in pressure, in turn, would cause the actuating arm 276, and thus the blocking arm 274, to move back towards the flow position. This back and forth fluctuation may continue until an equilibrium position is attained where the blocking arm prevents enough fluid flow through the fluid flow path to keep the fluid pressure in the fluid flow path below the preset limit In this embodiment, the pressure blocking device 270 functions as a pressure regulating valve.

Figure 4:
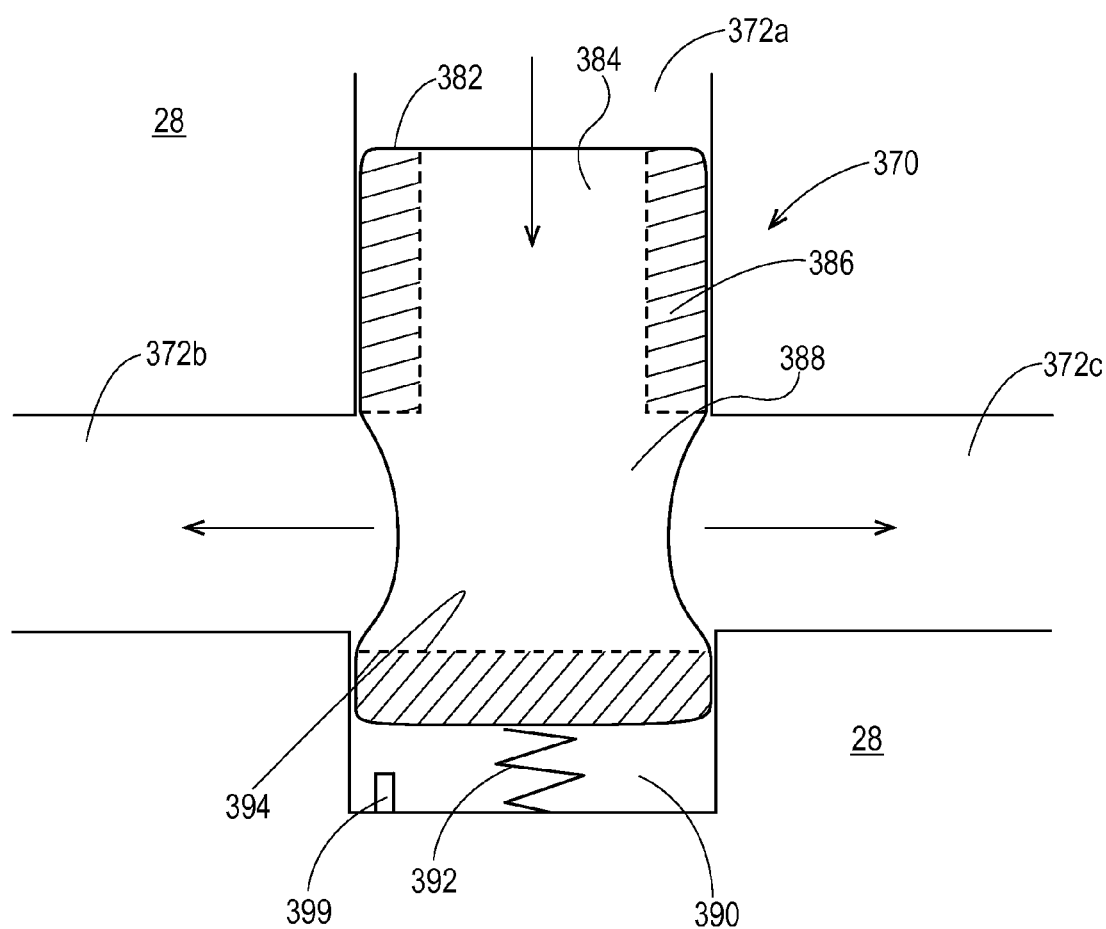
FIG. 4 is a cross-sectional view of an alternate embodiment of a pressure blocking device that may be incorporated into a low pressure mold.

Turning now to FIG. 4, another embodiment of a pressure blocking device 370 is illustrated. Where the fluid flow path 372 branches, a pressure blocking device 370 may be installed to prevent excessive fluid pressure from reaching mold cavities downstream of the pressure blocking device 370. The pressure blocking device 370 may be installed in a location that is contained within the mold 28. The pressure blocking device 370 may include a body 382 having a hollow flow path 384. The body 382 may include a solid or blocking section 386 and a hollow or flow section 388. The flow path 372 may include a well 390. A biasing element, such as a spring 392 may be located within the well, between the mold 28 and the pressure blocking device 370. As long as the fluid pressure acting on a bottom surface 394 of the flow path 384 produces a force that is less than is needed to overcome the force provided by the spring 390, the pressure blocking device remains in a flow position and fluid flows through the pressure blocking device 370. When pressure acting on the bottom surface 394 produces a force that exceeds the spring force provided by the spring 390, the pressure blocking device 370 moves downward into the well 390 until the blocking section 386 blocks fluid flow from a first fluid flow path 372a into a second fluid flow path 372b or into a third fluid flow path 372c. An optional proximity sensor 399 may be located in the well 390 to alert a user that the pressure blocking device 370 is approaching the bottom of the well 390. The user may then take appropriate action to reduce fluid pressure before the pressure blocking device 370 stops fluid flow.

Yet another embodiment of a pressure blocking device 470 is illustrated in FIGS. 5A-5D. The pressure blocking device 470 is a pressure relief valve 496 that is located within the barrel 524 to allow excess pressure to bleed back in to barrel 524. The pressure relief valve 496 prevents pressure above a preset limit from passing the pressure relief valve 496 and reaching the mold cavity 32 (FIG. 1). More specifically, the pressure relief valve 496 includes a spherically-shaped nose 495 that is connected to an annular skirt 497. The annular skirt 497 includes a pressure sensitive feature, such as a pressure relief device or a rupture disc 498 to prevent damaging an injection mold tool from excessive cavity pressures. If pressure within the barrel 524 in front of the pressure relief valve 496 exceeds a preset threshold, the rupture disc 498 breaks (or the pressure relief device opens), fluidly connecting the barrel 524 behind the pressure relief valve 496 with the barrel 524 in front of the pressure relief valve 496. As a result, molten thermoplastic or thermoset material flows aft, through the annular skirt 497 through a series of channels and/or cross holes from a higher pressure region in front of the pressure relief valve 496 to a lower pressure region behind the pressure relief valve 496 to maintain a preset pressure in front of the pressure relief valve 496.

Figure 5A:
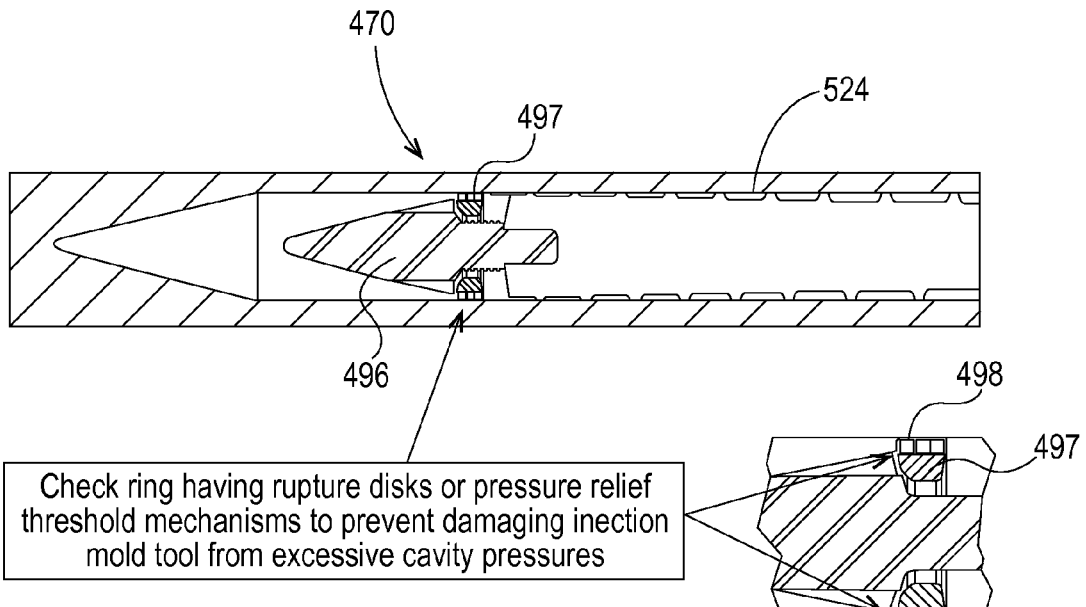
FIGS. 5A to 5D are cross-sectional views of a pressure relief device that may be disposed within a barrel of an injection molding machine.
Figure 5B:
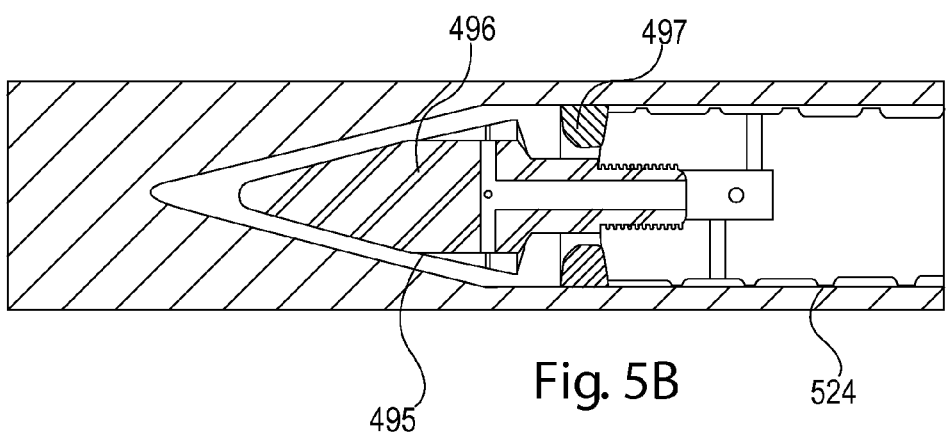
Figure 5C:
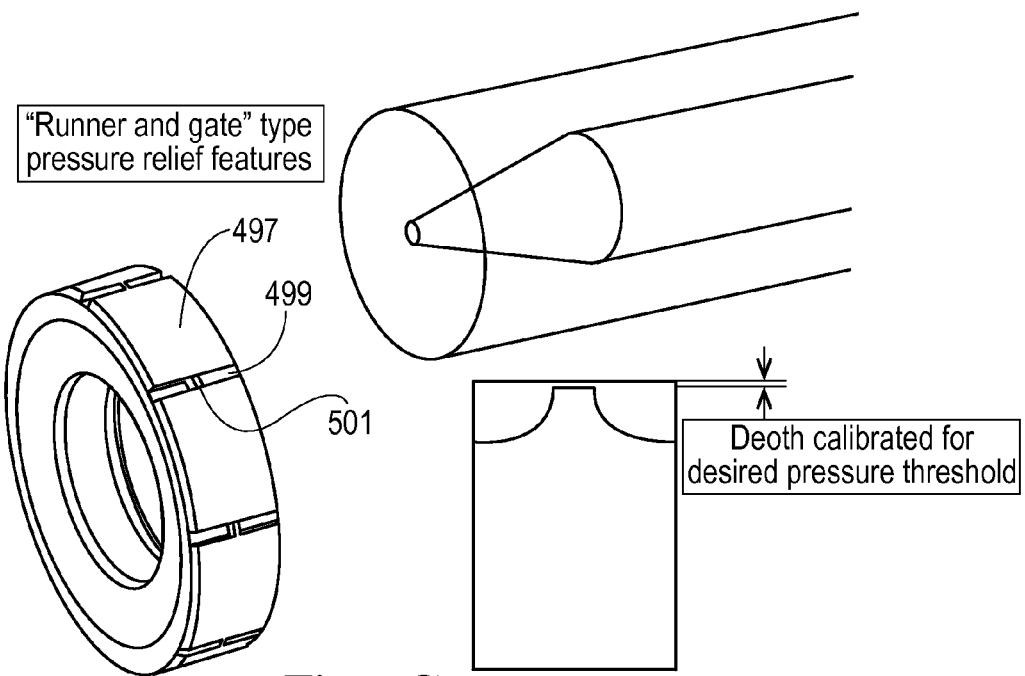
Figure 5D:
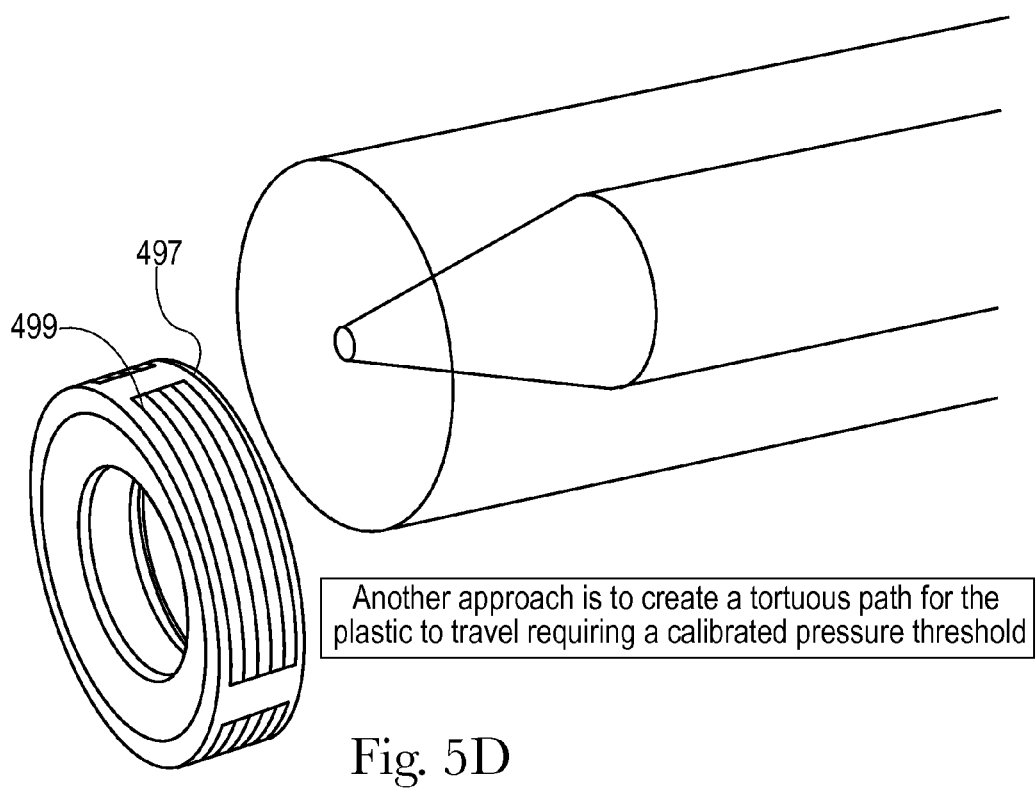

In another embodiment, as illustrated in FIGS. 5C and 5D, the pressure sensitive feature in the annular skirt 497 may take the form of a channel 499. The channel 499 may include a calibrated depth feature 501, as illustrated in FIG. 5C, that maintains pressure below a preset threshold, or the channel 499 may form a tortuous path, as illustrated in FIG. 5D. The channel 499 may be calibrated for different molten thermoplastic or thermoset viscosities at a given maximum pressure, temperature, and/or shear rate threshold.

Figure 6A:
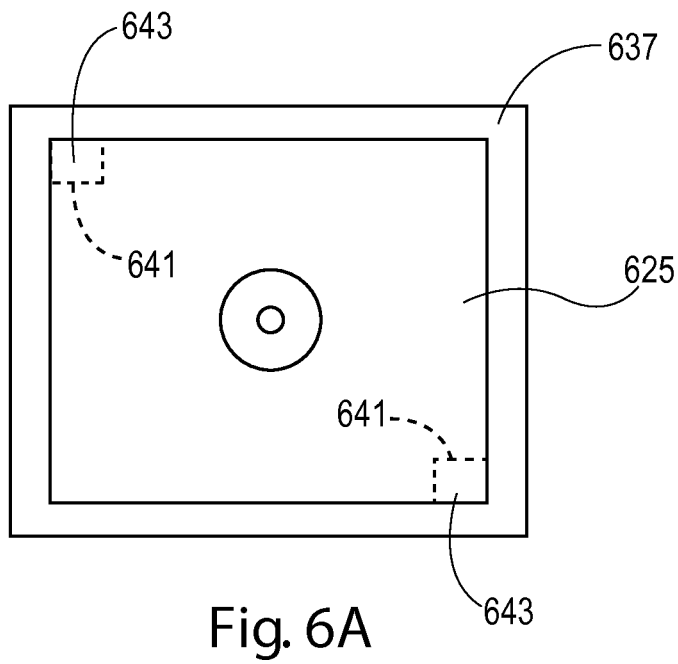
FIG. 6A is a top plan view of one mold side and a mold support plate that include a lock and key mechanism.

Another method of preventing overpressurization of a mold 628 is to have a lock and key fail safe device disposed between one mold side 625 and the support plate 637. Turning now to FIG. 6A, a mold side 625 that is designed to be used in a low pressure injection molding machine includes one or more posts or keys 641. The support plate 637 may include one or more cut-outs or keyholes 643 that at least partially receive the keys 641 so that the mold side 625 may fully seat against the support plate 637. As a result, the mold side 625 will only fit on the support plate 637 if the keys 641 and key holes 643 align with one another. Only support plates 637 in low pressure injection molding machines will have the appropriate key holes 643. If the low pressure mold side 625 is attempted to be placed in a traditional high pressure injection molding machine, the keys 641 will prevent full seating against the support plate, which will prevent the high pressure injection molding machine from functioning correctly. As a result, the low pressure mold side 625 will not be overpressurized and possibly damaged in the high pressure injection molding machine.

Figure 6B:
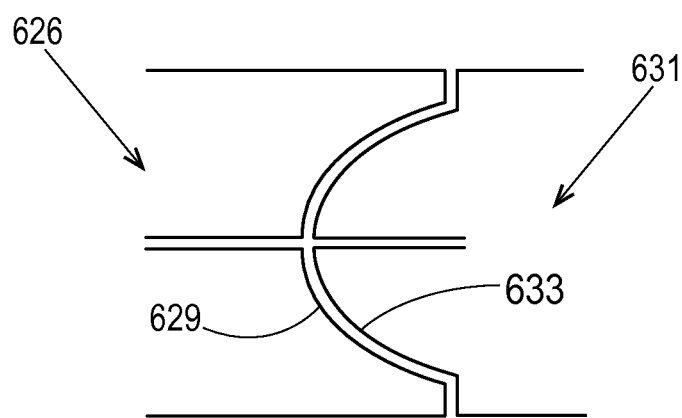
FIG. 6B is a cross-sectional view of an alternative embodiment of a lock and key mechanism disposed on a nozzle and a sprue.

Another embodiment of a lock and key fail safe device may be disposed between a nozzle and a sprue bushing interface, as illustrated in FIG. 6B. A nozzle 626 may include a female mating surface, such as a spherically concave mating surface 629, and a sprue bushing 631 may include a male mating surface, such as a spherically convex mating surface 633. In some examples, the nozzle 626 and sprue bushing 631 may have 0.5 inch radius spherically concave and convex mating surfaces respectively. In other embodiments, the mating surfaces may have larger or smaller radius mating surfaces. In yet other embodiments, the male and female mating surfaces may have different shapes, such as conical, cylindrical, pyramidal, or any other shape as long as the sprue bushing mating surface is a male surface and the nozzle mating surface is a female surface. By forming a male mating surface on the sprue bushing, a low pressure mold would not work in a high pressure injection molding machine because high pressure injection molding machines have nozzles with male mating surfaces. Thus, the nozzle-sprue bushing lock and key fail safe mechanism described above would prevent a low pressure injection mold from being damaged if placed in a high pressure injection molding machine.

Yet another method of preventing overpressurization of a low pressure mold is to limit the clamp tonnage that is applied to the first and second mold parts. Limiting the clamp tonnage may be done mechanically, as illustrated in FIGS. 7A-7C, or the clamp tonnage may be limited electrically with a clamp tonnage sensor.

Figure 7A:
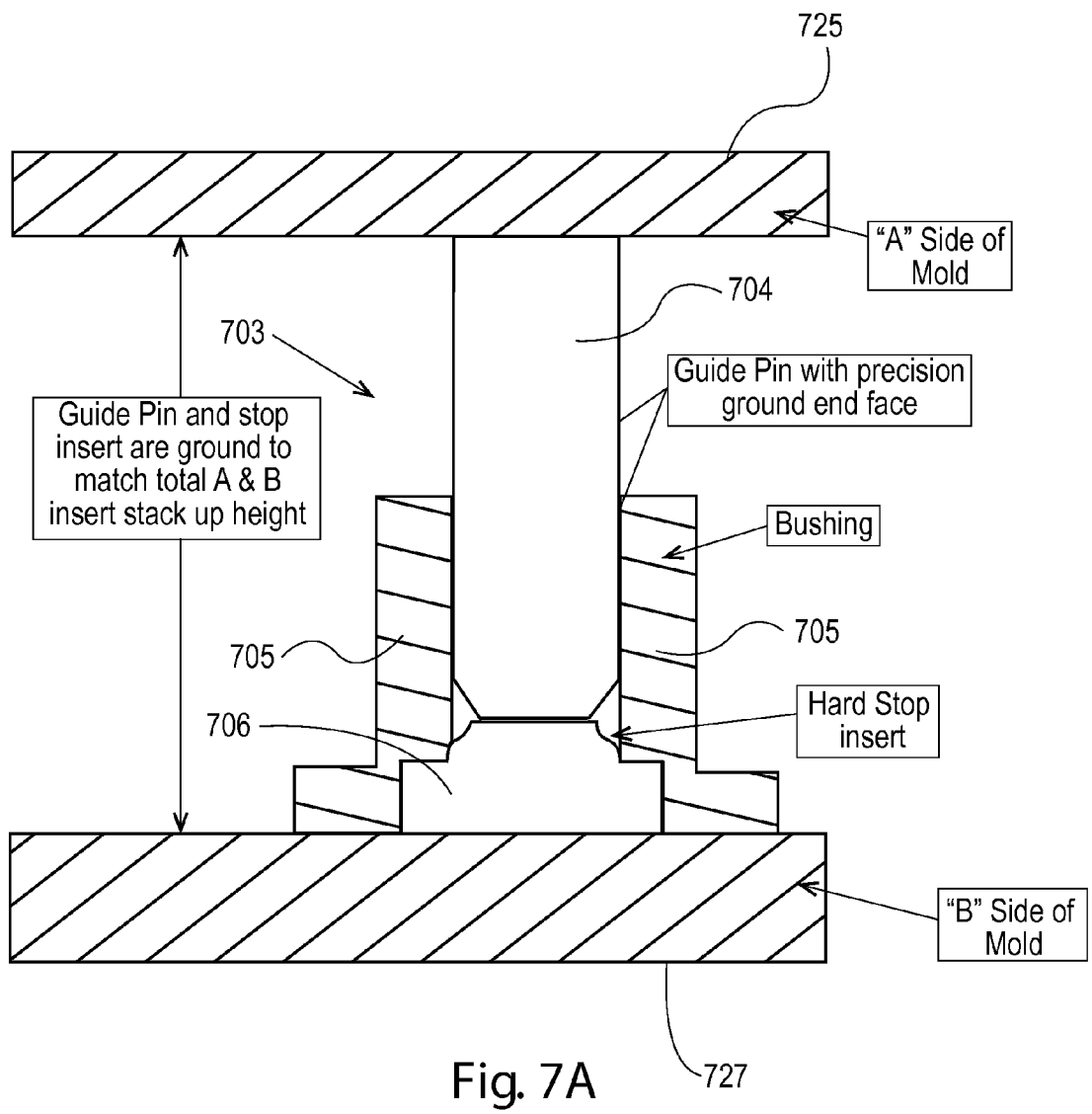
FIGS. 7A to 7C are side views of three embodiments of a mechanical clamp tonnage limiter.

Turning now to FIG. 7A, a mechanical clamp limiter 703 is illustrated. By measuring a total thickness of a stack up, a final clamped distance between the first mold side 725 and the second mold side 727 may be calculated. Once the final clamped distance is known, the mechanical clamp limiter 703 may be sized to stop travel of the first mold side 725 towards the second mold side 727 when the final clamped distance is reached. As a result, overclamping can be prevented.

The mechanical clamp limiter 703 includes a guide pin 704 that is attached to the first mold side 725. In some embodiments, the guide pin 704 that may have a precision ground end face at a distal end. A bushing 705 and hard stop insert 706 may be attached to the second mold side 727. A thickness of the hard stop insert 706 plus a length of the guide pin 704 determine a minimum distance between the first mold side 725 and the second mold side 727, which can be set to the calculated final clamped distance. In other words, the guide pin 704 and the hard stop insert 706 may have a total thickness equal to a height of an A and B insert together. When the guide pin 704 contacts the hard stop insert 706, further movement of the first mold side 725 towards the second mold side 727 is prevented. As a result, any additional clamping forces (which would normally result in an overclamping force) are carried by the guide pin and the hard stop insert. Thus, the first and second mold sides 725, 727 are prevented from being subject to overclamping forces and possibly damage. In one embodiment, the guide pin 704 and the hard stop insert 706 are capable of withstanding up to about 10 times the maximum rated pressure of the low pressure mold, preferably more than 275.79 MPa (40,000 psi), more preferably between 344.74 MPa (50,000 psi) and 482.63 MPa (70,000 psi), and more preferably about 413.69 MPa (60,000 psi).

Figure 7B:
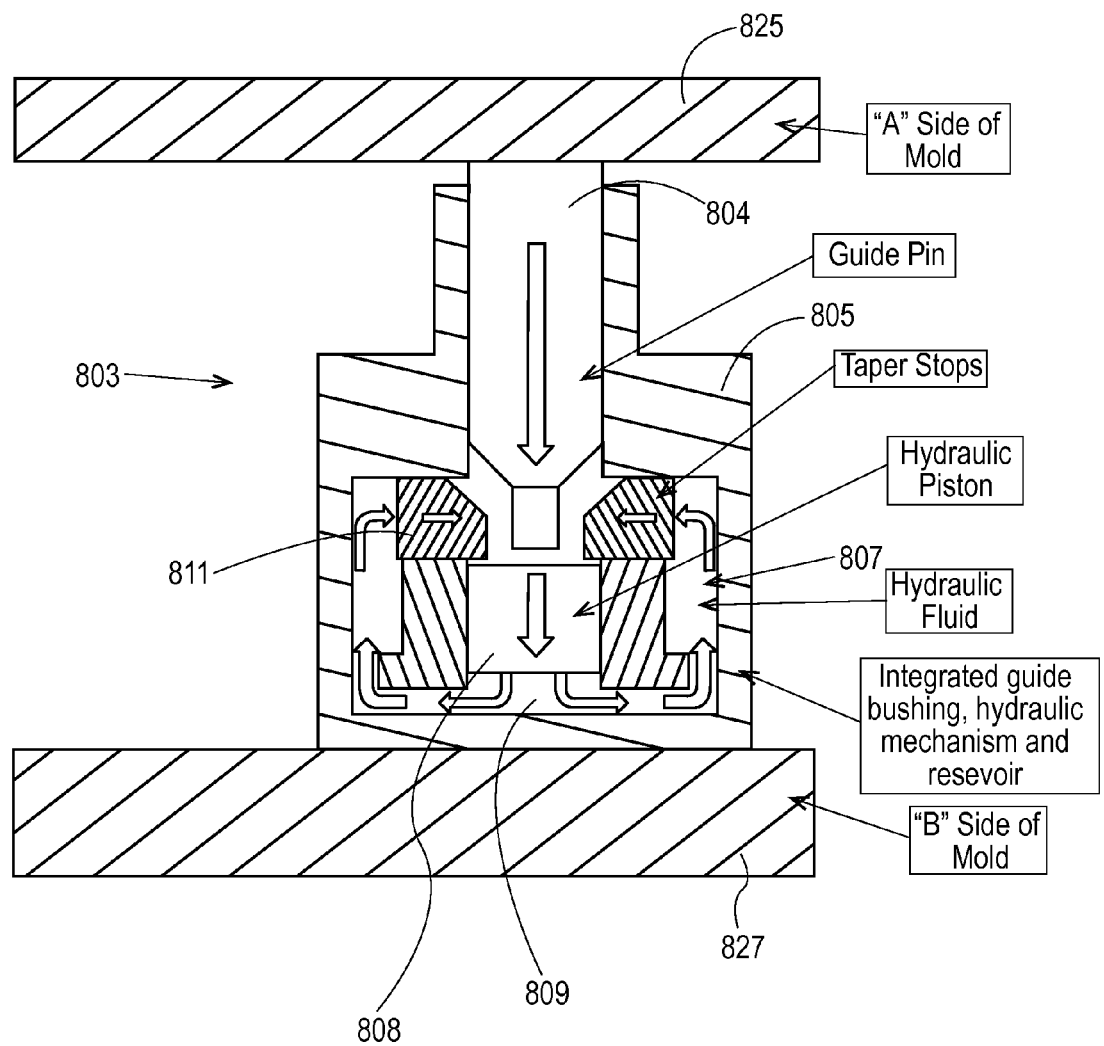
Figure 7C:
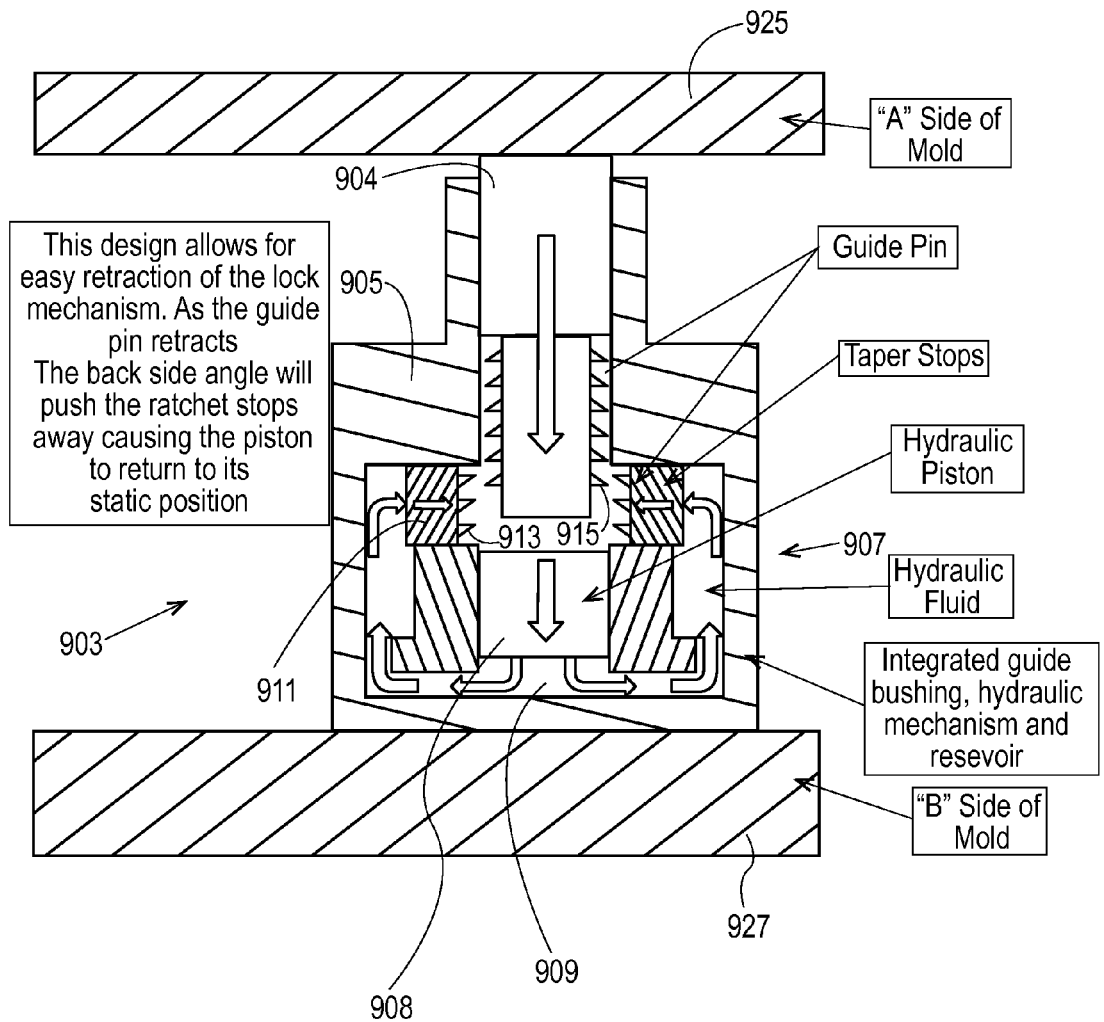

FIG. 7B illustrates a second embodiment of a mechanical clamp tonnage limiter 803. Like the embodiment of FIG. 7A, the first mold side 825 may includes a guide pin 804 and the second mold side 827 may include a guide bushing 805. However, the guide bushing 805 may include an integrated hydraulic interlock device 807. The hydraulic interlock device 807 may include a hydraulic piston 808, a hydraulic circuit 809 and a hydraulic lock 811. The hydraulic lock 811 may include one or more taper stops. As the first mold side 825 moves towards the second mold side 827, the guide pin 804 contacts the hydraulic piston 808. The hydraulic piston 808 may be biased by a biasing device (not shown) to resist further movement of the guide pin 804 up to a predetermined clamp tonnage. Once the predetermined clamp tonnage is exceeded, the hydraulic piston 808 will move downward in FIG. 7B (in a direction opposite the guide pin 804), which causes the hydraulic fluid in the hydraulic circuit 809 to move the hydraulic locks 811 inward, towards the guide pin 804. The hydraulic locks 811, when engaged, mechanically prevent any further movement of the guide pin 804. As a result, the mechanical clamp tonnage limiter 803 prevents overclamping of the first and second mold sides 825, 827, and possibly damage to the mold.

FIG. 7C illustrates an alternate embodiment of a mechanical clamp tonnage limiter 903, which is similar to the mechanical clamp tonnage limiter 803 of FIG. 7B. The mechanical clamp tonnage limiter 903 includes a guide pin 904, a hydraulic bushing 905, a hydraulic piston 908, a hydraulic circuit 909, and a hydraulic lock 911, all of which operate as described in FIG. 7B. However, the hydraulic lock 911 includes a set of ratchet stops or locking teeth 913 and the guide pin 904 also includes a set of ratchet stops or locking teeth 915. The locking teeth 913 and 915 are angled so that when the hydraulic lock 911 is engaged, further movement of the guide pin 904 towards the hydraulic piston 908 is prevented, while allowing movement of the guide pin 904 in the opposite direction, away from the hydraulic piston 908 due to the interaction between back side angles of the locking teeth 913 and 915. The mechanical clamp tonnage limiter advantageously allows for a larger calibration window for clamp up adjustments. The number of teeth on the guide pin 904 may be adjusted to allow for a broad range of stack heights.

In yet other embodiments, other types of clamp tonnage limiters may be employed including, but not limited to: auxiliary hydraulics on the press to actuate side locks, or to provide a counter force to offset primary clamp tonnage if excessive tonnage is detected; a hydraulic driven device that is built in to the mold to provide this offsetting counter pressure; or the support plate first or second mold side being supported by a hydraulic reservoir, which if pressurized beyond a control limit, vents hydraulic fluid to relieve hydraulic pressure such that the pressure on the first and second mold sides is relieved, causing the support primary clamp tonnage to be absorbed by a support structure separate from critical mold components.

In yet other embodiments, electronic locks may be used that react to a sensor measurement of clamp tonnage. The electronic lock may use the sensor measurement to stop the press if clamp tonnage is exceeded. The sensor could detect pressure directly along a parting axis of the first and second mold sides, or indirectly by monitoring strain in the tie bars supporting the clamp tonnage, for example. A similar sensor measurement may be used to actuate an active mechanical lock either using press hydraulics or a servo driven mechanism.

When using a sensor measurement of clamp tonnage, a record of clamp tonnage exposures may be maintained for the purpose of determining if the mold has been exposed to excessive clamp pressure. This information may be useful in diagnosing the cause of damage to a mold, and also may be used to determine if warrantee conditions have been violated during the operation of the mold. Alternatively, pressure sensitive films or papers may be used to detect clamping pressures.

Figure 8A:
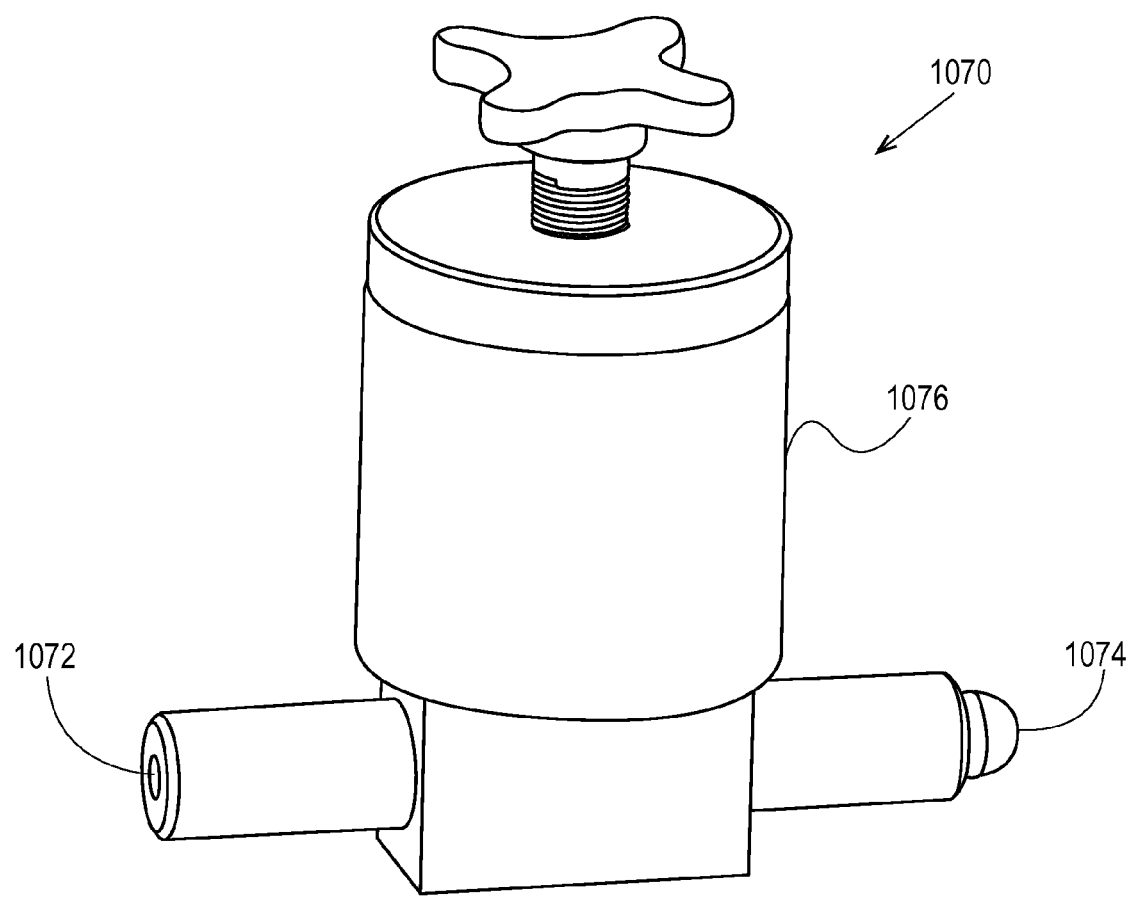
FIG. 8A is a perspective view of an embodiment of a pressure relief device that includes a spring loaded nozzle.
Figure 8B:
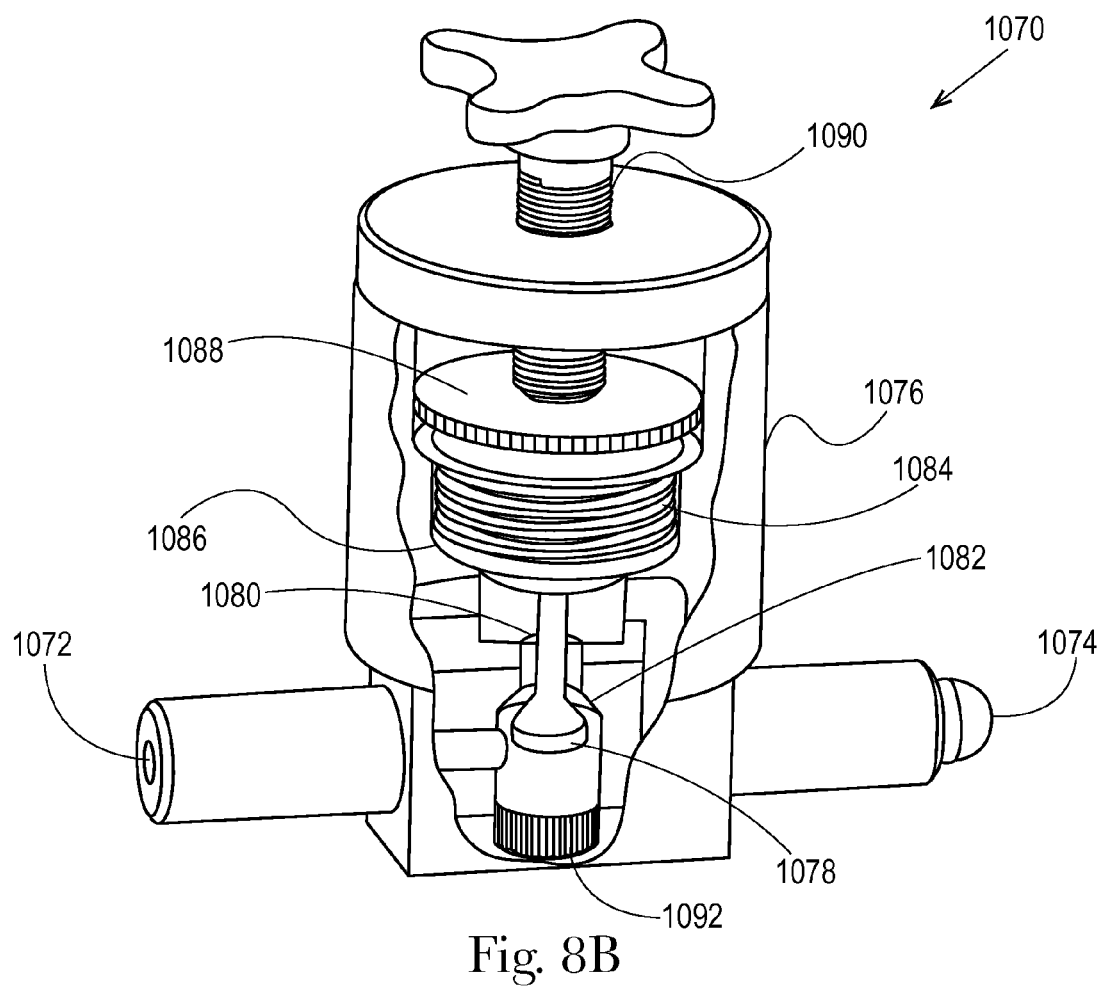
FIG. 8B is a transparent perspective view of the pressure relief device of FIG. 8A.
Figure 8C:
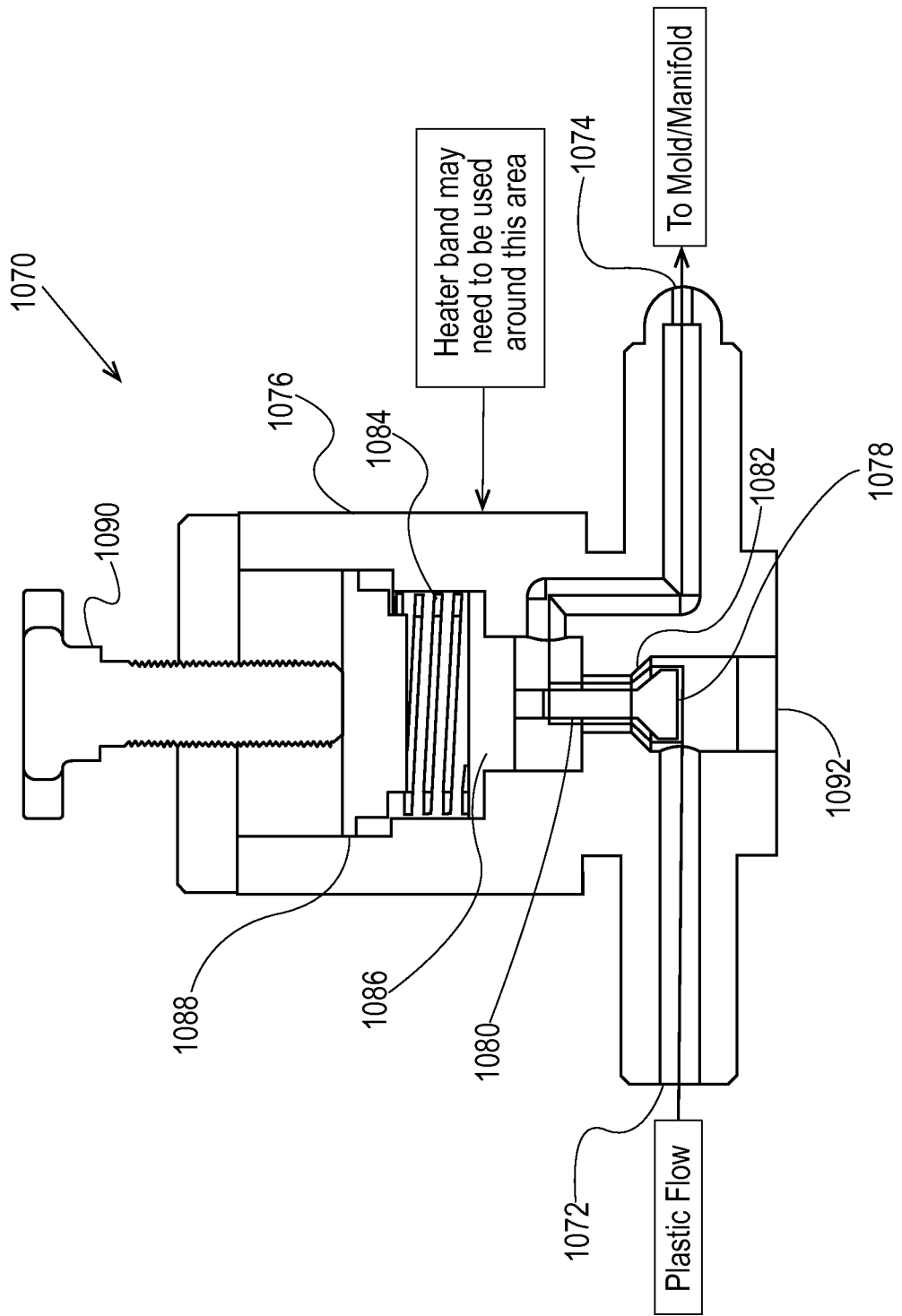
FIG. 8C is a cross-sectional view of the pressure relief device of FIG. 8A.

Turning now to FIGS. 8A-8C, an alternative embodiment of a failsafe device includes a spring loaded nozzle-bushing connection 1070. The spring loaded nozzle-bushing connection 1070 is connected to a gate of a mold and prevents excessive fluid pressure from entering the mold. The spring loaded nozzle-bushing connection 1070 includes a fluid inlet 1072, a fluid outlet 1074, and a spring loaded valve 1076. The spring loaded valve 1076 includes a valve plug 1078 that is connected to a valve stem 1080. The valve plug 1078 is biased away from a valve seat 1082 by a spring 1084. The valve plug 1078 and the valve seat 1082 cooperate to control fluid flow through the spring loaded valve 1076. The spring 1084 biases a plate 1086, which is connected to the valve stem 1080. The spring 1084 is trapped between a plate 1086 and a spring seat 1088. The spring seat 1088 is movable within the spring loaded valve 1076. An adjustment mechanism, such as a screw 1090 may be threadedly attached to the spring loaded valve 1076, the adjustment mechanism determining a location of the spring seat 1088 within the spring loaded valve 1076.

Normally, fluid flows from the nozzle into the inlet 1072, around the valve plug 1080, and to the outlet 1074 to the mold. When fluid pressure from the inlet 1072 is sufficient to overcome the spring force from the spring 1084, the valve plug 1078 moves into contact with the valve seat 1082, thus preventing further fluid flow to the mold. Once positioned, the valve plug 1078 may be locked in position by a locking mechanism (not shown). When the valve plug 1078 contacts the valve seat 1082, fluid is vented through an auxiliary port 1092. In some embodiments a heater band (not shown) may be disposed around the spring loaded valve 1076 to improve fluid flow through the spring loaded valve 1076.

FIGS. 9A-9D illustrate an alternative embodiment of a failsafe device that includes a spring loaded nozzle-bushing connection 1170. The spring loaded nozzle-bushing connection 1170 is connected to a gate of a mold and prevents excessive fluid pressure from entering the mold. The spring loaded nozzle-bushing connection 1170 includes a fluid inlet 1172, a fluid outlet 1174, and a spring loaded valve 1176. The fluid outlet 1174 may be fluidly connected to an injection mold manifold by a riser or sprue. The spring loaded valve 1176 includes a hollow valve pin 1178 that reciprocates within the spring loaded valve 1176. The valve pin 1178 is biased towards the fluid outlet 1174 by a calibrated compression spring 1184. The valve pin 1178 normally covers one or more auxiliary ports 1192 thereby allowing fluid flow through the spring loaded valve 1176. The spring 1184 bases a plate 1186, which is connected to the valve pin 1178. The spring 1184 is trapped between the plate 1186 and a spring seat 1188.

Figure 9A:
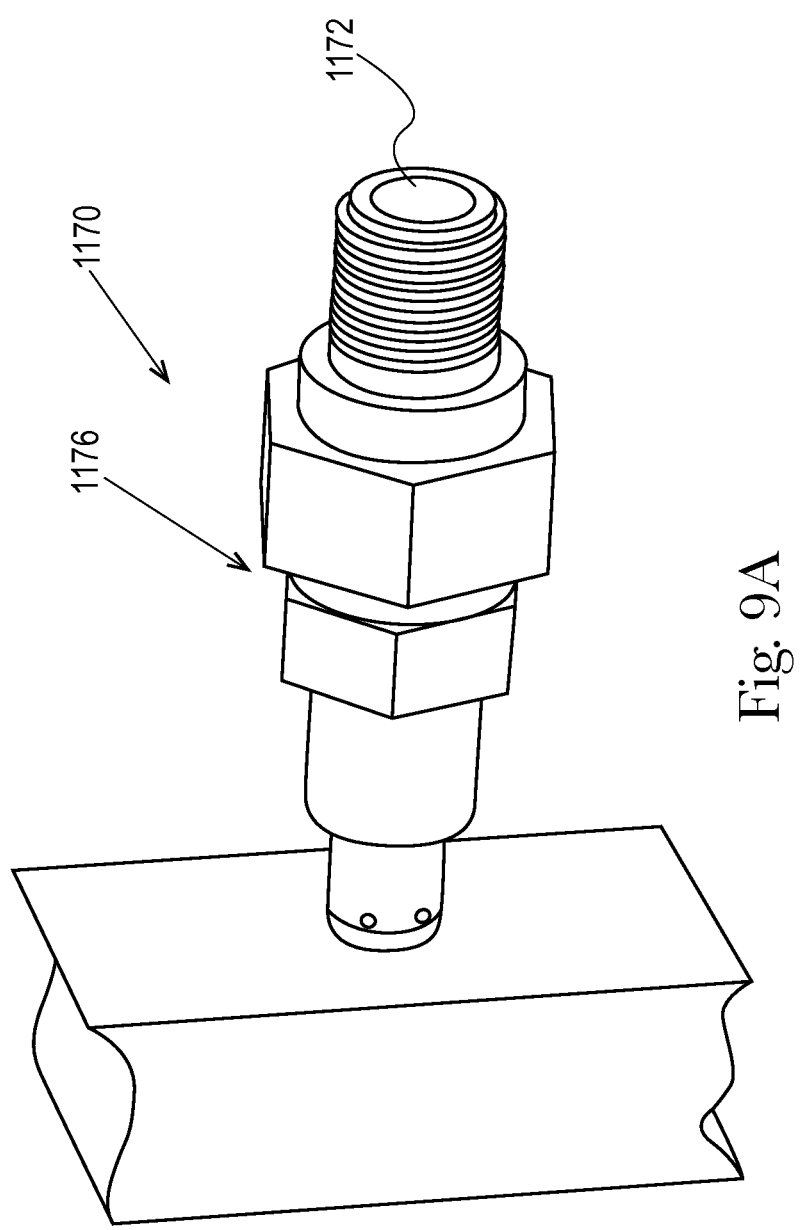
FIG. 9A is a perspective view of an alternative embodiment of a pressure relief device including a spring loaded nozzle.
Figure 9B:
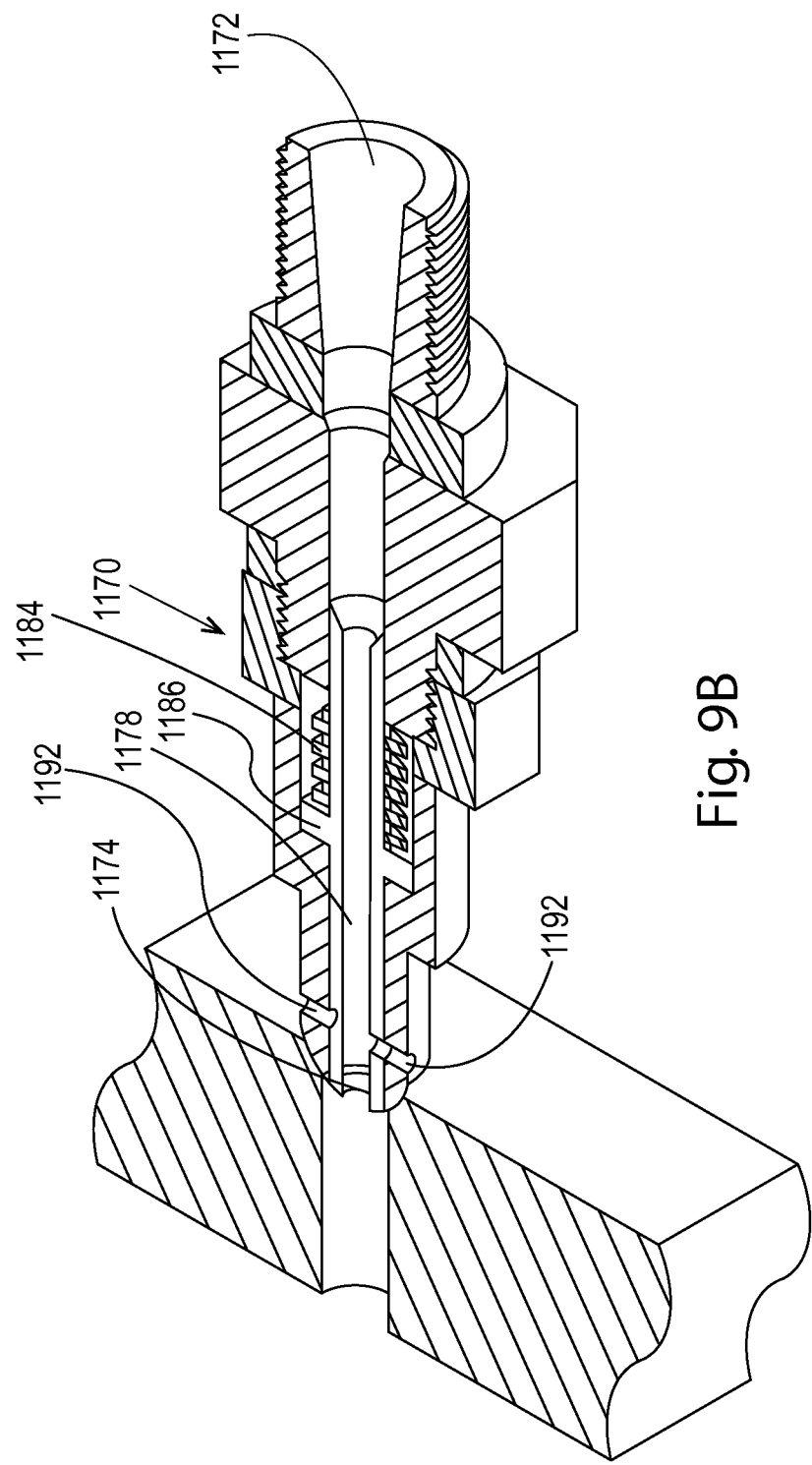
FIG. 9B is a transparent perspective view of the pressure relief device of FIG. 9A.
Figure 9C:
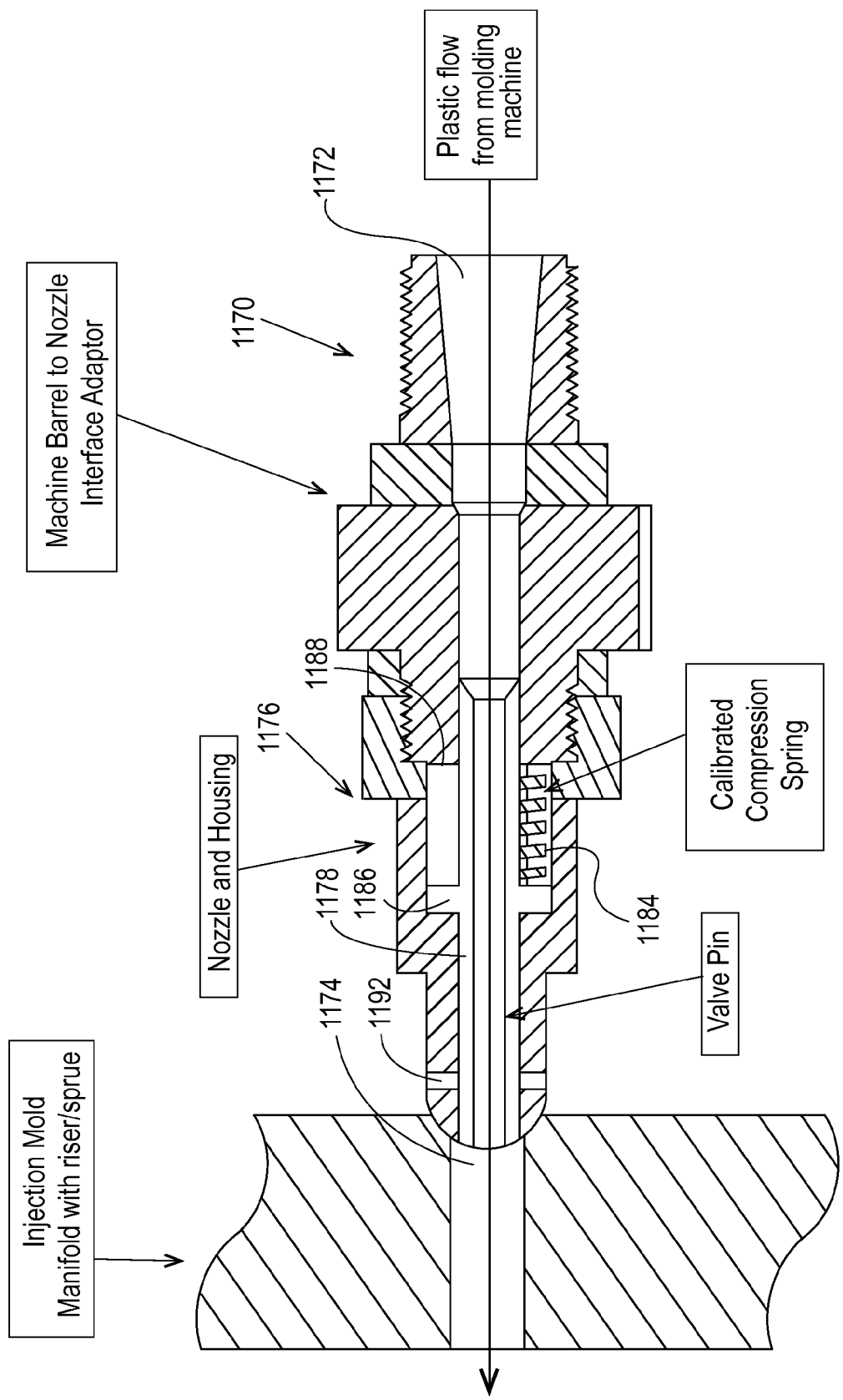
FIG. 9C is a cross-sectional view of the pressure relief device of FIG. 9A.

Normally, fluid flows from the nozzle into the inlet 1172, which is part of a machine barrel to nozzle interface adaptor, through the valve pin 1178, and to the outlet 1174 to the mold (see FIG. 9C). When fluid pressure from the inlet 1172 is sufficient to overcome the spring force from the spring 1184, the valve plug 1178 moves away from the fluid outlet 1174, thus exposing the one or more auxiliary outlets 1192 (see FIG. 9D). Once positioned, the valve pin 1178 may be locked in position by a locking mechanism, not shown. While the fluid outlet 1174 to sprue connection is illustrated as a convex-concave connection, in other embodiments the convex and concave surfaces may be reversed (i.e., a concave surface on the fluid outlet 1174 and a convex surface on the sprue) as a further preventative measure to prevent a low pressure injection mold from being placed in a high pressure injection molding machine.

The disclosed molds advantageously prevent damage to a low pressure injection mold from exposure to excessive pressures or excessive clamping tonnage, such as when the low pressure mold is accidentally disposed in a high pressure injection molding machine. By preventing damage, costs can be greatly reduced as producing a single low pressure mold for a high capacity injection molding machine may cost in excess of $10,000 to $100,000 or more for each mold.

It is noted that the terms "substantially," "about," and "approximately," unless otherwise specified, may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Unless otherwise defined herein, the terms "substantially," "about," and "approximately" mean the quantitative comparison, value, measurement, or other representation may fall within 20% of the stated reference.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An injection molding apparatus comprising:
a melt holder for pressurizing a molten material prior to injection;
an injection system for injecting the molten material from the melt holder into a mold;
a sensor for sensing a melt pressure of the molten material within the apparatus;
a controller that is:
communicatively connected to the sensor, to receive a pressure signal from the sensor, and
communicatively connected with the injection system; and
means for preventing installation of a mold into the injection molding apparatus when the injection molding apparatus is capable of injecting molten material at pressures in excess of a maximum design pressure for the mold.

2. The injection molding apparatus of claim 1, wherein the failsafe device may only be overridden by an intentional action from an operator.

3. The injection molding apparatus of claim 1, wherein the maximum design pressure for the mold is input into the controller through an input device operatively connected to the controller.

4. The injection molding apparatus of claim 1, further comprising an electronic media connected to the mold, the electronic media storing the maximum design pressure for the mold and the controller being communicatively connected to the electronic media to receive the maximum design pressure for the mold from the electronic media.

5. The injection molding apparatus of claim 4, wherein the electronic media is one of an RFID chip and a microchip.

6. The injection molding apparatus of claim 5, wherein the one of the RFID chip and the microchip is permanently attached to the mold.

7. The injection molding apparatus of claim 1, wherein the maximum design pressure for the mold is less than 68.95 MPa (10,000 psi).

* * * * *